Patented Aug. 17, 1948

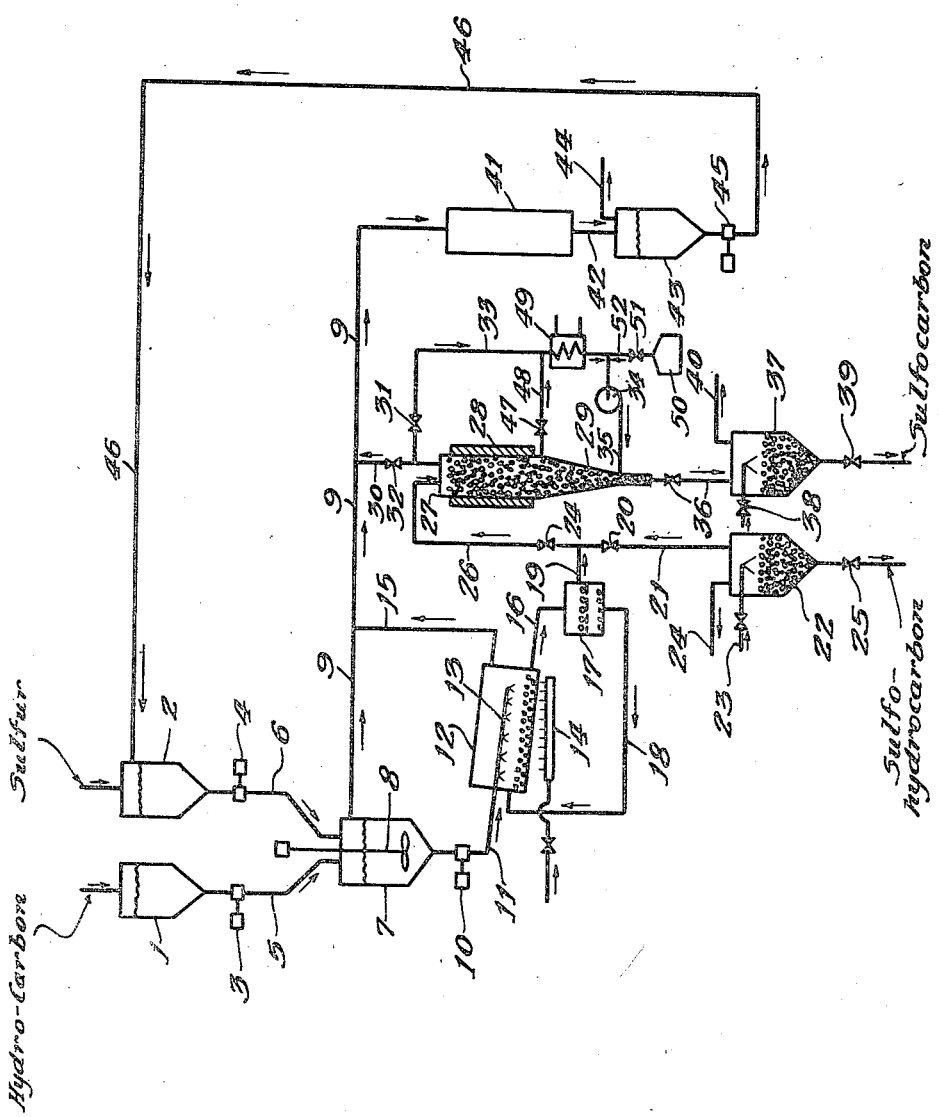

2,447,005

UNITED STATES PATENT OFFICE 2,447,005

METHOD AND APPARATUS FOR PRODUCING SULFO COMPOSITIONS

Bernard W. Gamson, Chicago, Ill., assignor to Great Lakes Carbon Corp., Morton Grove, Ill., a corporation of Delaware Application February 23, 1946, Serial No. 649,731

11 Claims. (Cl. 260—139)

This invention relates to a method for the production of "sulfohydrocarbons" and "sulfocarbons" by the reaction of sulfur and heavy hydrocarbons under controlled conditions, said compositions being described in my copending application, Serial No. 649,730 filed February 23, 1946. This application is a continuation in part of my copending application Serial Number 546,427, filed July 24, 1944.

The sulfohydrocarbons are highly amorphous, substantially homogeneous, black, infusible solids having a real density of from about 1.3 to about 1.7 comprising sulfur substantially in chemical combination with carbon and hydrogen, the products being further defined and characterized by their following percentage by weight composition:

Carbon from about 47% to about 70%
Hydrogen from about 4.0% to about 1.8%
Sulfur from about 50% to about 25%
Ash negligible to about 2.5%

The foregoing defined sulfohydrocarbons are in general produced by intimately mixing and heating sulfur with suitable heavy hydrocarbons to form a reaction mixture which is liquid at a temperature of from about 300° F., to about 400–450° F., and then heating the liquid material to a temperature of from about 450° F., to about 575–625° F., to produce the solid reaction product.

These sulfohydrocarbons are useful for such purposes as fillers, reinforcing agents, preparation of adsorptive materials and other products and as an intermediate in the synthesis of other carbon compounds.

The sulfocarbons are highly amorphous, hard, black, infusible solids comprising sulfur in stable chemical combination with carbon and hydrogen, having a density of from about 1.5 to about 1.9 the products being further defined and characterized by their following percentage by weight composition:

Carbon from about 70% to about 93%
Hydrogen from about 1.8% to about 0.3%
Sulfur from about 25% to about 6%
Ash from about 0.1% to about 2.5%

The foregoing sulfocarbons are in general produced by the heat treatment or calcining of said sulfohydrocarbons in an inert atmosphere at a temperature of from about 1100° F., to about 1500 to 1800° F.

These sulfocarbons are useful for such purposes as fillers, reinforcing agents and adsorbents, and as intermediates in the synthesis and manufacture of other carbon compounds such as carbon tetrachloride and carbon disulfide. The sulfocarbons especially suited for the production of carbon disulfide of high purity, and in substantially quantitative yield are those containing less than about 1.3% of hydrogen and generally result at a temperature of formation of about 1200° F. to about 1600° F., and preferably at about 1400° F.

Among the objects of the present invention are the production of the aforesaid products in improved character and yield by means of novel process and inter-related process steps, the employment of reaction byproducts in the process, and the over-all economies thereof.

In general the over-all process of the present invention comprises the following steps: (1) Heating suitable heavy hydrocarbons with sulfur at a temperature of from about 300° F. to about 450° F., accompanied by good stirring, to provide a liquid reaction mixture; (2) spraying the liquid to form a film generally upon a preformed solid granular or lump intermediate product at a temperature within the range of about 450° F. to about 625° F., and preferably not above 575° F., to solidify the liquid film upon the solid and evolve a gaseous material which is largely hydrogen sulfide; (3) screening the solid lump product, recycling to spraying and solidification the "under size" and passing the "oversize" on to further processing; (4) optional—withdraw a portion of the "oversize" solid to form a sulfohydrocarbon product; (5) calcining the remaining portion or all of the sulfo-hydrocarbon "oversize" to a temperature within the range of from about 1100° F. to 1800° F., and preferably not above 1500° F., in an inert atmosphere comprising preferably hydrogen sulfide formed in the process, which may be wholly self-generated in situ or may be drawn from the hydrogen sulfide streams generated in steps (1) and (2) to so serve in any desired degree; (6) discharging the sulfocarbon product.

The heavy hydrocarbons which are suitable for the reaction with sulfur, as disclosed in my aforesaid co-pending application, are in general hydrocarbons or mixtures of hydrocarbons which boil above about 350° F., or are liquefiable below about 400° F. Their hydrogen content is generally not less than about 4% nor greater than about 12%, and, preferably, not exceeding about 10%. In addition, there are hydrocarbon substances having a hydrogen content below 4% and which fuse or soften above 400° F., even as high as 500° F., or so. Examples of such are extraction residues of coal tar pitch and the naturally occurring asphaltites such as grahamite. These in contrast to such as coal are soluble in the heavy hydrocarbons, say, about 25% at 250° F., in a cracked residuum, which softens at 85° F., and contains about 9% hydrogen and thus may be satisfactorily used. The hydrocarbons which are essential, therefore, to the production of the above defined sulfo-compositions comprise the natural and derived asphalts, coal and petroleum tars and pitches or extraction residues, topped crudes, residuums, acid sludge derivatives, and the like.

The proportion of sulfur to be used in the reaction is preferably substantially stoichiometrically equivalent to the amount required to convert the hydrogen contained in the hydrogen feed to hydrogen sulfide, although from say from about 90% to about 110% of the theoretical equivalent may be used without serious departure from substantially high yields or quality of the resulting compositions.

The rate of temperature rise during the calcination to produce the sulfocarbon is of importance so as to minimize the production of fines by degradation of the granular or lump product induced by thermal strains or excessive pressures of evolving gaseous products within the solid lumps. The rate of temperature rise found desirable does not exceed about 6° F., per minute to 800° F., or until a substantial proportion of the potentially volatile material has been evolved. Above about 800° F., the temperature rise should not exceed about 11° F., per minute.

The accompanying drawing diagrammatically illustrates an arrangement of apparatus for carrying out the process of the present invention.

Referring to the drawing, my present process for producing the aforesaid compositions of sulfur with carbon and hydrogen substantially in chemical combination may be carried out as follows: The organic feed and sulfur enter the charging vessels 1 and 2 respectively, wherein the organic feed is heated to a liquid state at a temperature of 250° F. to 350° F. and the sulfur is liquefied to a temperature of about 300 F., which is below that at which it becomes viscous. The amounts of reactants are proportioned by pumps 3 and 4 through lines 5 and 6 into the reaction vessel 7 and thoroughly agitated by stirrer 8 to make a homogeneous fluid mixture. The temperature in reaction zone 7 is selected in the range of from about 300° F. to 450° F. depending on the hydrocarbon. However, a considerable sulfurization reaction may be permitted to take place therein, in which case the preferred upper temperature is at about 400° F. or below in order to maintain control of the foaming which occurs. When desired, an initial sulfurization reaction in zone 7 may proceed to a point where about 5% or more of the hydrogen is evolved as hydrogen sulfide but not to the extent that the reaction mixture at this stage loses its liquid state. During such sulfurization reaction a gaseous product substantially of hydrogen sulfide is evolved and discharges through line 9. Although it is preferred that liquid reactants be introduced into zone 7, it should be understood that while not so convenient to handle, solid forms of the reactants may also be put into zone 7 by suitable means and then melted therein to form a homogeneous liquid mixture.

The liquid mixture is transferred by means of pump 10 through line 11 to a solidification zone 12, shown as a rotary kiln, and sprayed from nozzles 13 within the kiln to form liquid films upon a preformed solid granular or lump product at a temperature selected in the range of 450° F. to 625° F. depending on the composition of the solid product desired, but preferably not above about 575° F. in order to obtain a more desirable relatively non-porous and mechanically homogeneous solid product. However, while not so satisfactory because of the greater opportunity to form wall incrustations and longer residence time required for the desired particle growth, the rotary kiln 12 may be operated without using a granular solid seeding charge since sufficient quantities of the sprayed liquid droplets will solidify as separate particles to form nucleii for further contact with sprayed liquid and subsequent growth to desired solid sizes. The heating requirements may be met as indicated by the external heater 14. Further amounts of hydrogen sulfide are evolved and solidification of the liquid films occurs, generally in a matter of seconds and sometimes several minutes depending somewhat on the nature of the hydrocarbon charged. Spraying and solidification continues until a desired growth, say, to one inch diameter lumps has been obtained.

The formation of the solid sulfo-compositions into balls or lumps by the foregoing described method has several advantages among which may be listed: A uniform sized product convenient for handling through other process steps, shipping, etc.; a compacted lump product which has a low porosity, high bulk density, and high crushing strength; a solid form having low pressure drop characteristics when packed into reaction towers; and as a form convenient for handling in crushing operations when a finer sized uniformly good strength irregular shaped granular material is desired.

The gaseous products comprising hydrogen sulfide are discharged through line 15 and the solid lump product is discharged through line 16 into a classifier 17 where it is separated into oversize and undersize. The undersize constitutes the seeding charge for kiln 12 and is returned thereto by way of line 18 to repeat the growth cycle described. The ratio of undersize recycled to kiln 12 to oversize withdrawn may vary from about 1:1 to 4:1 or more, and depends upon the factors, rate of growth, temperature, rate of liquid feed, mechanical attrition, etc. The oversize constitutes an intermediate product, the composition of which is characterized as a sulfohydrocarbon and as such a portion of it controlled by valve 20 may be withdrawn through lines 19 and 21 as a finished product to be quenched with a water spray 23 in receiver 22; quenching vapors are discharged at 24 and the sulfohydrocarbon is discharged by line and valve 25 at a temperature of about 250° F., to minimize its absorption of water.

The remaining portion or all of the oversize discharging from classifier 17 passes by way of line 19, valve 24 and line 26 to a calcining zone 27 where the sulfohydrocarbon undergoes conversion to a sulfocarbon. The calcining zone 27 may, for example, be a shaft furnace either singly or a parallel multiple thereof. The lump sulfohydrocarbon enters the shaft furnace at about 475° F., to 550° F., to form a continuous bed flowing therethrough at a suitably regulated rate and is calcined in the upper section 28, fitted with a heater, to a temperature selected in the range of 1100° F., to 1800° F., for example, to 1400° F., for a sulfocarbon desirable for the production of carbon disulfide.

During calcination a vaporous product comprising hydrogen sulfide is evolved. The requirements for an inert atmosphere during the calcination are met by this gaseous product but it is also undertstood, although not shown, that the gaseous products from reaction zones 7 and 12 may also so serve. As the bed passes through the calcining section 28 it enters a cooling and heat transfer (solid to gas) section 29. The gaseous products evolving from furnace 27 discharge into line 30 through valve 32 after having been cooled by the incoming solid charge from line 26 and are combined with other process gases in line 9. A portion of the gases may be withdrawn from line 30 through line 33 controlled by valve 31 (valves 47 and 51 closed), further cooled when needed in heat exchanger 49 and recirculated to the cooling-heat transfer section 29 by blower 34 and line 35 to provide a relatively inert atmosphere for cooling the downwardly flowing calcined charge. These gases mingle with those evolving in calcining section 28 and discharge therewith into line 30. In some instances it may be desirable especially toward the upper limit of calcining temperature to provide an inert cooling atmosphere from another source such as generator 50. For such operation valve 31 is closed and the inert gas from generator 50 controlled by valve 51 at, say, a temperature of 450° F. is forced from line 52 by blower 34 through line 35 into the cooling section 29 and after cooling the calcined charge a substantial portion of such gas is withdrawn through valve 47, line 48 and cooler 49 to be recirculated by blower 34 with make-up gas from generator 50.

The cooled calcined solid product is discharged from the furnace 27 at about 500° F. through valve and line 36 into a quenching zone 37 where it may be sprayed with water controlled by valve 38 and withdrawn through valve 39 preferably not below about 250° F. so as to contain a minimum of absorbed water; this solid product now has the composition characterized as a sulfocarbon. The quenching vapors from zone 37 are exhausted through line 40.

The gaseous products consisting substantially of hydrogen sulfide from the initial mixing zone 7, from the solidification reaction zone 12 through line 15, and from the calcining zone 27 through line 30 are combined and transferred in line 9 to a suitable oxidation zone 41. The sulfur vapor produced therein is condensed in line 42 into a liquid receiver 43 from which the spent gases are exhausted through line 44 and the molten sulfur is transferred by pump 45 and line 46 to the sulfur charging vessel 2 for re-use in the process.

It is further understood that the solid products of the foregoing described process may be subjected to heat-soaking at the temperature of formation, or within the range thereof, for a period of several hours if so desired for the purpose of altering the composition or to reduce potentially volatile constituents depending upon the use to which these products may be put. For example, that portion of the "oversize" sulfohydrocarbon which may be withdrawn as such from the size classifier 17 may be passed into a heat-soaking zone (not shown) and held at a temperature in the range of 450° F. to 625° F. for any period of time before being quenched in vessel 22, in which case some volatile products will be evolved and sent into line 9. Continuing the example, the rate of passage of the sulfocarbon through calcining zone 27 may be so adjusted as to allow a heat-soaking for any desired period of time at the selected calcining temperature before cooling in zone 29.

Having now described the process of this invention, the following examples will illustrate more fully the operation of the process and the nature of the products obtained therefrom.

*Example I*

A charge consisting of 1345 lbs. sulfur and 1002 lbs. petroleum pitch having the following properties:

| | |
|---|---:|
| Softening point °F | 220 |
| Carbon per cent | 90.4 |
| Hydrogen do | 8.5 |
| Sulfur do | 1.0 |
| Ash do | 0.1 |
| Coke residue (A. S. T. M.) do | 33.2 |
| Volatile (A. S. T. M.) do | 66.8 | was mixed with good agitation in the liquid state at 300° F. and further partially reacted at 400° F. to the extent that approximately 11% of the hydrogen in the organic feed was evolved as hydrogen sulfide, amounting to 6% of the total charge. The amount of sulfur in the charge was stoichiometrically equivalent to the hydrogen contained in the petroleum pitch.

The liquid reaction mixture was then sprayed within a rotary kiln at 500° F. to form a film or layer upon the particles of a preformed solid granular product. Solidification of the liquid films occurred within a few seconds. Spraying and solidification continued during about one-half hour until a solid, relatively non-porous and mechanically homogeneous product grown to approximately one inch size lumps and smaller had resulted. The solid product was discharged into a size classifier from which an oversize (about one inch) and an undersize (less than one inch) were obtained. The undersize was returned to the kiln to maintain a continuous solidification and growth operation. In this operation, sufficient undergrowth and mechanical attrition occurred so that a ratio of two parts of undersize were recycled for each part of finished product (oversize) withdrawn from this operation. During the solidification reaction, volatile products amounting to 31% of the total charge to the process were evolved and consisted of hydrogen sulfide, elemental sulfur and condensable hydrocarbons in the approximate proportions,

| | Percent by weight |
|---|---:|
| Hydrogen sulfide | 80 |
| Elemental sulfur | 16 |
| Condensable hydrocarbons | 4 |
| | 100 |

The intermediate solid product (oversize) at this point in the process contained 97.2% of the carbon originally present in the petroleum pitch. The infusible solid product is a chemical combination of sulfur with carbon and hydrogen, defined as a sulfohydrocarbon and had the following percentage composition,

| | Percent |
|---|---|
| Carbon | 59.90 |
| Hydrogen | 2.45 |
| Sulfur | 37.50 |
| Ash | 0.15 |
| | 100.00 |

The intermediate product was charged at a temperature of about 475° F., into a shaft furnace to form a moving bed and was calcined to 1400° F., in a recirculating self-generated inert atmosphere comprising hydrogen sulfide; the rate of temperature rise for the conversion of the sulfohydrocarbon to a sulfocarbon was kept below 6° F. per minute to 800° F. and did not exceed about 9° F. per minute thereafter until 1400° F. was reached, whereupon the sulfocarbon so produced was held for ten minutes before cooling to 500° F. and quenching with water to 250° F. During this calcination step volatile products were evolved amounting to approximately 21% of the total charge to the process, and consisted of hydrogen sulfide, carbon disulfide, elemental sulfur, condensable and gaseous hydrocarbons, and hydrogen in the over-all approximate proportions,

| | Percent by weight |
|---|---|
| Hydrogen sulfide | 59 |
| Carbon disulfide | 17 |
| Elemental sulfur | 15 |
| Hydrocarbons | 8.4 |
| Hydrogen | 0.6 |
| | 100.0 |

The sulfocarbon resulting from the calcination step is an infusible solid containing 92% of the carbon originally present in the petroleum pitch and amounted to 970 lbs. and had the following percentage composition,

| | Percent |
|---|---|
| Carbon | 85.80 |
| Hydrogen | 0.90 |
| Sulfur | 13.06 |
| Ash | 0.24 |
| | 100.00 |

The three gaseous product streams comprising hydrogen sulfide and which result from the various steps in the process were combined and oxidized to recover therefrom elemental sulfur for re-use in the process.

Example II

In the process as described in Example I, a coal tar pitch containing 4.25% hydrogen, less than 1% ash plus sulfur and softening at 306° F. was liquefied at 350° F. and reacted with molten sulfur amounting to 114% of its hydrogen equivalent. The solid lump sulfohydrocarbon resulting from solidification at 525° F. contained 100% of the carbon originally present in the coal tar pitch. One-third of the sulfohydrocarbon was removed and water quenched to become one finished product of the process having the following composition (ash-free basis),

| | Percent |
|---|---|
| Carbon | 63.7 |
| Hydrogen | 1.8 |
| Sulfur | 34.5 |
| | 100.0 |

The remaining two-thirds of the sulfohydrocarbon was converted to a sulfocarbon by calcining to 1400° F. in the shaft furnace and heat-soaking therein at the same temperature for eight hours. Little or no carbon was lost to volatile products and the resulting sulfocarbon had the composition (ash-free basis),

| | Per cent |
|---|---|
| Carbon | 88.9 |
| Hydrogen | 0.9 |
| Sulfur | 10.2 |
| | 100.0 |

Example III

A portion of the sulfohydrocarbon intermediate produced from a process as described in Example I from a petroleum pitch containing 8.7% hydrogen and reacted with an amount of sulfur equivalent to the hydrogen at a solidification temperature of 570° F. was heat-soaked for 19 hours at 570° F. upon discharge from the solidification zone. Analyses (ash-free basis) before and after heat-soaking were as follows:

| | | As discharged from kiln | After heat-soak 19 hours |
|---|---|---|---|
| Carbon | per cent | 64.0 | 67.9 |
| Hydrogen | do | 2.4 | 2.5 |
| Sulfur | do | 33.6 | 29.6 |
| | | 100.0 | 100.0 |

Example IV

A sulfocarbon of the composition and prepared from coal tar pitch as described in Example II was reacted with vaporous sulfur to synthesize carbon disulfide. Vaporous sulfur was passed through a bed of 8–14 mesh granular sulfocarbon one inch in diameter and 4 inches deep in an electrically heated tube furnace at the rate of approximately 2 grams per minute. Sixty-five per cent of the sulfur was converted to carbon disulfide per pass at 1400° F. The reaction commenced at the relatively low temperature of about 1200° F. and was completed at 1400° F. The carbon in the charge was quantitatively converted to carbon disulfide.

When a coal tar pitch coke calcined at 1400° F. was reacted with vaporous sulfur under similar conditions, the maximum conversion of the carbon to carbon disulfide was less than 20%.

I claim as my invention:

1. The method of producing sulfo-compositions which comprises intimately admixing at a temperature of from about 300° F. to about 400° F., hydrocarbon material having a hydrogen content of from about 4% to about 12% and sulfur in substantially stoichiometrical proportion to said hydrogen content, and spraying said reaction mixture while in liquid condition onto previously formed solid particles of sulfo-composition contained in a separate reaction zone heated to a temperature of from about 450° F. to about 625° F., to react said liquid and to accumulate the resulting solid, infusible sulfohydrocarbon reaction product thereof on said particles and to evolve gaseous products therefrom comprising hydrogen sulfide.

2. The method of producing sulfo-compositions which comprises intimately admixing at a temperature of from about 300° F. to about 400° F., hydrocarbon material liquid at said temperature and selected from the group consisting of normally liquid hydrocarbons boiling above 350° F., heavy hydrocarbons melting below about 400° F., and mixtures thereof with heavy hydrocarbons melting above about 400° F. and soluble therein, with an amount of sulfur in the proportion of from about 90% to about 110% of the stoichiometric equivalent of the hydrogen content of the hydrocarbon material, to form a liquid reaction mixture, spraying said reaction mixture onto solid particle product formed in the process and contained in a separate reaction zone, and tumbling and moving the resulting coated particles through said zone while heating them at a temperature of from about 450° F. to about 625° F., to react the components of said coating and to evolve gaseous materials comprising hydrogen sulfide and to accrete the resulting solid, infusible sulfohydrocarbon reaction product thereof onto said particles to form a homogeneous solid, infusible, insoluble product.

3. The method of producing sulfo-compositions which comprises intimately admixing at a temperature of from about 300° F. to about 400° F., hydrocarbon material having a hydrogen content of from about 4% to about 12% with sulfur in substantially stoichiometrical proportion to said hydrogen content, to form a liquid reaction mixture, spraying said reaction mixture onto previously formed solid sulfohydrocarbon particles contained in a separate reaction zone heated to a temperature of from about 450° F. to about 625° F., to coat them with films of and to react said liquid and to accumulate the resulting solid, infusible sulfohydrocarbon reaction product thereof on said particles and to evolve gaseous products therefrom comprising hydrogen sulfide, transferring resultant solid particle product to a calcining zone and gradually heating it therein to a temperature of from about 1100° F. to about 1800° F., and in a relatively inert atmosphere to convert it to a solid, infusible reaction product composed essentially of carbon and sulfur in chemical combination.

4. The method of producing sulfo-compositions which comprises intimately admixing and partially reacting in liquid phase condition and at a temperature of from about 300° F. to about 450° F. hydrocarbon material liquid at said temperature with sulfur in substantially stoichiometrical proportion to its hydrogen content, to form a liquid reaction mixture, spraying said reaction mixture while still in liquid condition to form films on previously formed solid sulfohydrocarbon particles contained in a separate reaction zone heated to a temperature of from about 450° F. to about 625° F., while tumbling the particles therein and continuously moving them therethrough to further react said liquid and to accrete the solid, infusible sulfohydrocarbon reaction product thereof on said particles and to evolve gaseous products therefrom comprising hydrogen sulfide, segregating relatively small from relatively large particle products, returning said smaller particles to said reaction zone, transferring the larger solid particle product to a calcining zone and heating it therein to a temperature of from about 1100° F. to about 1800° F., and in a relatively inert atmosphere comprising largely hydrogen sulfide formed in the process to convert it to its sulfocarbon solid, infusible reaction product.

5. A process for producing infusible, insoluble, amorphous, solids composed essentially of a major portion of carbon, and relatively minor proportions of sulphur and hydrogen, which comprises forming at a temperature of about 300 to about 450° F. a uniform liquid mixture of sulphur and a hydrocarbonaceous material liquifiable within the range of about 300–450° F., said sulphur being present in the proportion of at least about 90% the stoichiometric equivalent of the hydrogen content of said hydrocarbonaceous material, injecting the mixture in the form of droplets into a zone at a higher temperature thereby converting into discrete particles of said insoluble infusible solid and continuing to inject said droplets until the particles have grown to a desired size.

6. The process of claim 5 wherein the discrete particles are formed by spraying said liquid mixture into a conversion zone.

7. The process of claim 5 further characterized in that the discrete particles are formed by injecting the liquid mixture into a reaction zone containing solid granular particles of said insoluble, infusible substance under conditions to convert the liquid into a solid on the surfaces of said particles.

8. The process of claim 5 further characterized by the added step of calcining the discrete particles at a temperature in the range of 1100–1800° F.

9. A process for producing an infusible, insoluble, amorphous, solid composed essentially of a major portion of carbon, and relatively minor proportions of sulphur and hydrogen, the major part of said sulfur being in chemical combination, which comprises forming at a temperature of about 300 to about 450° F. a uniform liquid mixture of sulphur and a hydrocarbonaceous material heat liquifiable within the range of about 300–450° F., said sulphur being present in the proportion of at least about 90% the stoichiometric equivalent of the hydrogen content of said hydrocarbonaceous material, and spraying the liquid into a reaction zone to form a film on previously formed pieces of an intermediate product of the process, at a temperature of about 450° F. to about 625° F. to solidify the film on said pieces thereby increasing their size.

10. A process for producing infusible, insoluble, amorphous solids in the general form of balls, composed essentially of a major portion of carbon, and relatively minor proportions of sulphur and hydrogen, the major part of said sulphur being in chemical combination, which comprises forming at a temperature of about 300 to about 450° F. a uniform liquid mixture of elemental sulphur and a hydrocarbonaceous material liquifiable within the range of about 300–450° F., said elemental sulphur being present in the proportion of at least about 90% the stoichiometric equivalent of the hydrogen content of said hydrocarbonaceous material, injecting the mixture as liquid droplets into a reaction zone at a temperature of about 450°–625° F. to form a film upon particles of solid material previously formed in the process as hereafter described, to convert the mixture into insoluble infusible solid and build up the size of said particles, removing the particles of increased size thus formed from the reaction zone, separating the particles of desired size, and returning particles of smaller size to said reaction zone to be built up.

11. The process of claim 10 further characterized by calcining the discrete particles at a temperature in the range of 1100–1800° F.

BERNARD WM. GAMSON.

(References on following page)

REFERENCES CITED

The following references are of record in the file of this patent:

UNITED STATES PATENTS

| Number | Name | Date |
|---|---|---|
| 480,235 | Dubbs | Aug. 2, 1892 |
| 898,378 | Kohler | Sept. 8, 1908 |
| 1,157,935 | Gray | Oct. 26, 1915 |
| 1,824,523 | Adams | Sept. 22, 1931 |
| 1,896,227 | Egloff | Feb. 7, 1933 |
| 2,090,187 | Credo | Aug. 17, 1937 |
| 2,109,692 | Forney | Mar. 1, 1938 |
| 2,147,578 | Hendrey | Feb. 14, 1939 |
| 2,178,325 | Kobbe | Oct. 31, 1939 |
| 2,210,877 | Bray | Aug. 13, 1940 |
| 2,312,750 | Cohen | Mar. 2, 1943 |
| 2,330,934 | Thacker | Oct. 5, 1943 |
| 2,372,230 | Sommer | Mar. 27, 1945 |
| 2,380,466 | Reiff | July 31, 1945 |
| 2,399,717 | Arveson | May 7, 1946 |